(12) United States Patent
Fainshtein (10) Patent No.: US 10,134,079 B2
(45) Date of Patent: Nov. 20, 2018

(54) SYSTEMS AND METHODS FOR OFFLINE ECOMMERCE PURCHASES USING AN ITEM CATALOG FOR A USER

(71) Applicant: PAYPAL, INC., San Jose, CA (US)

(72) Inventor: Maxim Fainshtein, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 338 days.

(21) Appl. No.: 14/098,959

(22) Filed: Dec. 6, 2013

(65) Prior Publication Data

US 2015/0161714 A1 Jun. 11, 2015

(51) Int. Cl.
G06Q 30/00 (2012.01)
G06Q 30/06 (2012.01)
G06Q 30/02 (2012.01)

(52) U.S. Cl.
CPC ..... *G06Q 30/0635* (2013.01); *G06Q 30/0261* (2013.01); *G06Q 30/0269* (2013.01)

(58) Field of Classification Search
None
See application file for complete search history.

(56) References Cited

U.S. PATENT DOCUMENTS

| | | | | |
|---|---|---|---|---|
| 6,996,599 | B1* | 2/2006 | Anders | G06F 8/61 707/E17.032 |
| 2003/0018543 | A1* | 1/2003 | Alger et al. | 705/27 |
| 2004/0148229 | A1* | 7/2004 | Maxwell | G06Q 30/0277 705/14.73 |
| 2006/0242027 | A1* | 10/2006 | Falic | 705/26 |
| 2010/0070376 | A1* | 3/2010 | Proud | G06Q 20/20 705/21 |
| 2011/0238476 | A1 | 9/2011 | Carr et al. | |
| 2012/0078789 | A1* | 3/2012 | Harrell | G06Q 20/12 705/44 |
| 2012/0191577 | A1 | 7/2012 | Gonsalves et al. | |
| 2012/0221440 | A1* | 8/2012 | Roh | G06Q 30/06 705/26.82 |
| 2012/0284393 | A1 | 11/2012 | Gandhi et al. | |
| 2013/0232038 | A1 | 9/2013 | Murray | |
| 2014/0095943 | A1* | 4/2014 | Kohlenberg et al. | 714/47.3 |

OTHER PUBLICATIONS

Chang, Henry, et al. "Web browsing in a wireless environment: disconnected and asynchronous operation in ARTour Web Express." Proceedings of the 3rd annual ACM/IEEE international conference on Mobile computing and networking. ACM, 1997. (Year: 1997).*

* cited by examiner

*Primary Examiner* — Marissa Thein
*Assistant Examiner* — Michelle T Kringen
(74) *Attorney, Agent, or Firm* — Haynes and Boone, LLP (57) ABSTRACT

There is provided systems and method for offline ecommerce purchases using an item catalog for a user. A user may receive a catalog of items from a server, such as a merchant server and/or payment provider server, at a user device while the user device is connected to a network. The catalog of items may be transmitted to the user prior to the user entering an offline mode with the user device, where the user device is no longer connected to the network. While the user device operates in the offline mode, the user may browse the catalog and select items to purchase. On a future connection to the network, the user device may transmit a purchase request for the selected items to the merchant server and/or payment provider server.

20 Claims, 5 Drawing Sheets

SYSTEMS AND METHODS FOR OFFLINE ECOMMERCE PURCHASES USING AN ITEM CATALOG FOR A USER

TECHNICAL FIELD

Example embodiments of the present application relate generally to offline ecommerce purchases using an item catalog for a user, and more specifically to determining a catalog for a user and transmitting the catalog to the user while the user is connected to a network, where the user can utilize to catalog to perform shopping when the user is not connected to the network.

BACKGROUND

Consumers may utilize electronic devices to browse items available with a merchant and purchase those items. The merchant is free to update a catalog of items and advertise to the consumers while the consumers are online and connected to the merchant's server. However, if the consumer is in an area of low or no network connectivity, the merchant may no longer be able to offer items to the consumers. Additionally, a consumer may realize a desired purchase while the consumer is offline. For example, the consumer may board a plane where the consumer is required to turn off a network connection on their user device. While traveling on the plane, the consumer may realize an item they would like to have for their destination, such as a new article of clothing or a purchase of an item the consumer forgot to pack. The consumer may forego the purchase when the consumer reconnects to the network. Other times, the consumer may later make the purchase of the item; however, the consumer may waste time searching for the item and/or waiting on delivery of the item.

Merchants may utilize transaction histories to advertise items to a consumer. For example, items with strong searches/sales may inform the merchant that a particular item is likely to be well received or purchased if advertised to consumers who have not purchased the item. While this provides some background to creating a list of purchasable items for consumer, the list may not be exhaustive. Some consumers may make impulse purchases based on items viewed while traveling or browsing items in various locations. However, without predicting what items a consumer might view or need, the merchant may not be able to offer a list of desirable items to the consumer.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for offline ecommerce purchasing using an item catalog for a user. Systems suitable for practicing methods of the present disclosure are also provided.

A server, such as a merchant server or payment provider server, may determine a catalog for a user. The catalog may include at least on item for sale from a merchant. In various embodiments, the catalog may include high trend items from the merchant, such as daily sale items, items of high sales volume, or frequently searched items. In various embodiments, the server may determine and/or receive user preferences for items. For example, a user may input user preferences for items the user would like to see populated in a catalog. Additionally, the server may determine the user preferences using past user purchases, a user location, or additional user information such as a travel schedule and/or travel destination. A user location may effect both items in the catalog (e.g. item specific to a user location including clothing, food/restaurant purchases, regional sales, etc.) and the merchants offering items for sale in the catalog (e.g. a merchant local to a current location and/or destination location of the user to ensure timely pick-up or delivery of an item ordered by the user). In addition to determining at least one item in the catalog, the server may determine an inventory level and a price of the item(s) in the catalog.

Once the catalog has been created and populated with a requisite number of items, the catalog may be transferred to a user device for the user. The catalog may be transferred to the user device over a network while the user device is connected to the network. Additionally, the catalog may enable the user to make purchases when the user device is no longer connected to the network. For example, the user may enter an area where a user device receives little to no service, such as an airplane or a remote location. The user may continue to browse items available with the merchant while viewing the catalog. In certain embodiments, the catalog may display a last price and available inventory with the merchant for the item, alerting the user of potentially varying prices and/or inventory levels. However, where sufficient inventory and price stability is expected, such information may be omitted or hidden from view of the user. Thus, the user may view a price and item description.

Once the user reconnects to the network, the server may receive the purchase request for the item generated by the user. The user device may transmit the purchase request as soon as the user device determines a connection to the network is established or may request confirmation from the user to transmit the purchase request. Once the server receives the purchase request, the server may complete the purchase request. Where an item in the catalog included a price and/or inventory level, the server may check to determine if the price is the same and/or if inventory levels meet the demands of the user. If the server cannot fulfill the purchase request under terms originally agreed to by the user, the server may inform the user through the user device of the new price and/or inventory level.

When the user device reconnects to the network, the server may also update the catalog list with new items, prices, and/or inventory levels even where the user has not generated a purchase request. Additionally, the server can determine times when the user device is likely to have limited or no network connectivity. This determination may be made through a schedule of the user that is transmitted to the server, such as a plane/travel schedule, work schedule, etc. Additionally, based on knowledge of service coverage areas and a service plan of the user, the server may determine if the user is in, near, or travelling to an area with low or no network connectivity. Knowledge of a user's location and/or travel arrangements may also enable the server to provide mobile merchant services, such as a courier/delivery service for an item ordered through a purchase request.

Figure 1:
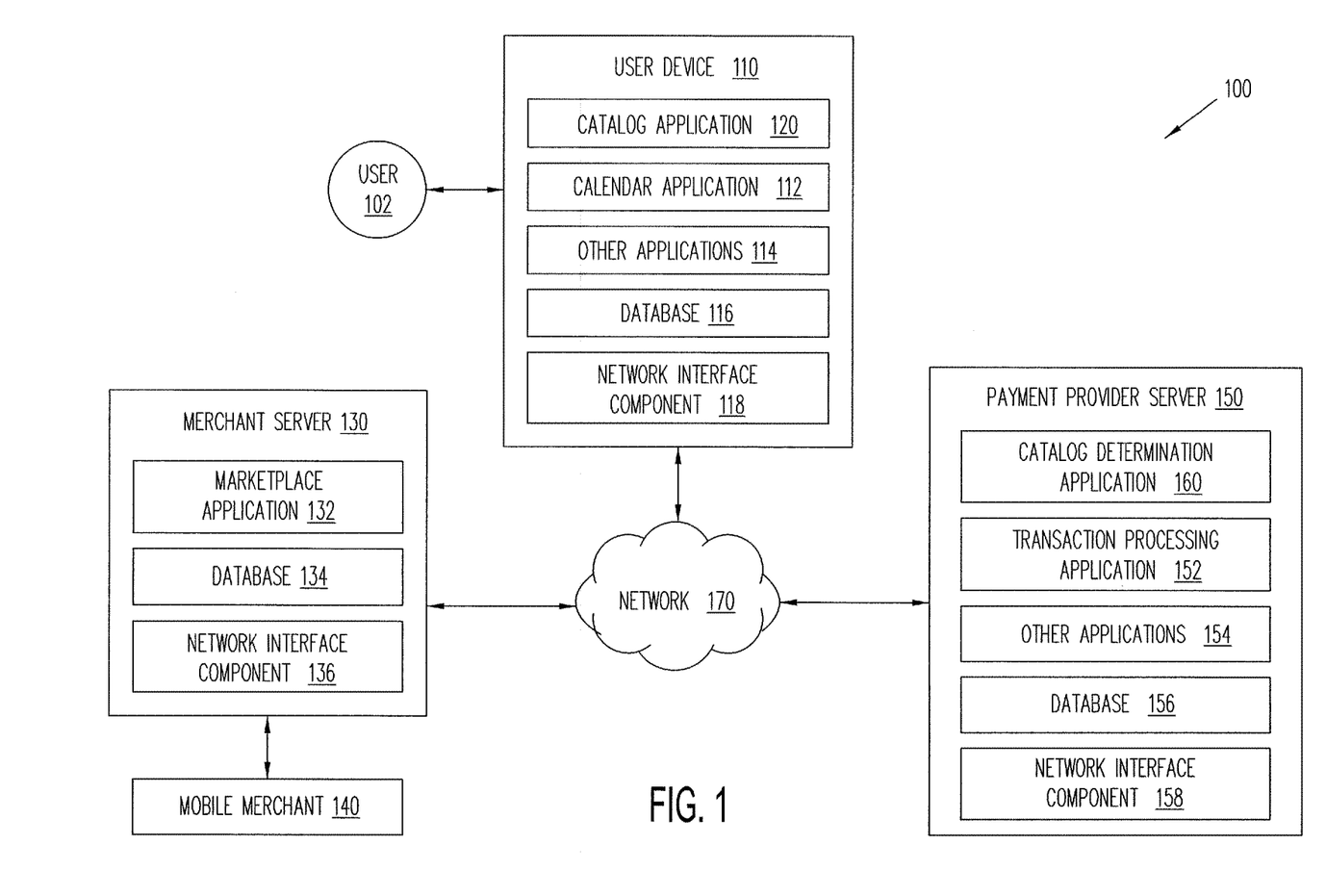
FIG. 1 is a block diagram of a networked system suitable for implementing the processes described herein, according to an embodiment.

FIG. 1 is a block diagram of a networked system 100 suitable for implementing the processes described herein according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, a merchant server 130, a mobile merchant 140, and a payment provider server 150 in communication over a network 170. User 102, such as a consumer, may utilize user device 110 to receive a catalog of items while connected to network 170 and create purchase requests for items in the catalog while disconnected from network 170. Payment provider server 150 may receive purchase orders for items from user device 110 when user device 110 reconnects to network 170. Payment provider server 150 may then complete the purchase request with merchant server 130, where merchant server 130 may utilize mobile merchant 140 to deliver items to user 102.

User device 110, merchant server 130, and payment provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

User device 110 may be implemented using any appropriate hardware and software configured for wired and/or wireless communication with merchant server 130 and/or payment provider server 150 over network 170. For example, in one embodiment, user device 110 may be implemented as a personal computer (PC), a smart phone, personal digital assistant (PDA), laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a user device is shown, the user device may be managed or controlled by any suitable processing device. Although only one user device is shown, a plurality of user devices may be utilized.

User device 110 of FIG. 1 contains a catalog application 120, a calendar application 112, other applications 114, a database 116, and a network interface component 118. Catalog application 120, calendar application 112, and other applications 114 may correspond to processes, procedures, and/or applications executable by a hardware processor, for example, a software program. In other embodiments, user device 110 may include additional or different software as required.

Catalog application 120 may be used, for example, to provide a convenient interface to permit user 102 to view catalogs of items received from payment provider server 150 and create purchase requests for items in the catalog. For example, catalog application 120 may be implemented as an application having a user interface enabling the user to open and browse one or more catalogs for items available from one or more merchants, select items in the catalog, view item descriptions/prices/inventory, and generate a purchase request for the item. Where user device 110 is connected to network 170, the purchase request may be transmitted to payment provider server 150 immediately for completion of the purchase request. However, in various embodiments, user device 110 is not connected to network 170. Thus, the generated purchase request may be stored by user device 110 for transmission to payment provider server 150 when user device 110 reconnects to network 170.

When user device 110 reconnects to network 170, the generated purchase request may be transmitted to payment provider server 150 immediately or after approval by user 102. User 102 may set a preference with catalog application 120 to determine when purchase requests are transmitted to payment provider server 150. For example, user 102 may determine that purchase requests generated in an offline mode of user device 110 are immediately transmitted to payment provider server 150 on detection of network connectivity. In other embodiments, user 102 may determine a delay before transmission of the purchase requests or may require catalog application 120 to alert user 102 of network connectivity and request approval to transmit the purchase request on approval by user 102.

Catalog application 120 may further receive updates to the catalog (e.g. new items, removed items, etc.) and/or items (e.g. item description and/or item price/item inventory level with one or more merchants) in the catalog from payment provider server 150, as will be explained in more detail herein. Catalog application 120 may perform updates to the catalog and/or items so that user 102 may view a most current catalog. The updates to the catalog may be synchronized so that the updates occur before user device 110 loses network connectivity. Payment provider server 150 may determine times of synchronization, as will be explained in more detail herein.

Catalog application 120 may further provide an interface to review updated purchase requests transmitted from payment provider server 150 when a price and/or inventory of an item changes between generation of an original purchase request by user 102 and transmission of the purchase request to payment provider server 150. Updated purchase requests may be created by payment provider server 150, as will be explained in more detail herein.

In certain embodiments, catalog application 120 may include options to transmit user preferences corresponding to a catalog and/or items in the catalog to payment provider server 150. The user preference may be utilized by payment provider server 150 to generate the catalog, as will be discussed in more detail herein. Catalog application 120 may receive user preferences from direct user input. Additionally, catalog application 120 may receive user preferences from another application of user device 110, such as calendar application 112 and/or a map application. For example, user preferences may correspond to a trip user 102 plans on taking, information about the trip (e.g. time and/or locations of the trip), a current and/or destination location of user 102, or other preference information. Catalog application 120 may scrape user preferences from other sources, such as online user accounts/profiles, social networking accounts and/or postings, blogging/microblogging services, email applications etc. Catalog application 120 may also save user searches in the catalog and transmit to payment provider server 150 when user device 110 reconnects to network 170.

Catalog application 120 may also provide social networking services, email services, and/or other services having messaging, posting, or other communication services. Such services may be utilized to notify other users of transmitted and/or completed purchase requests. In various embodiments, catalog application 120 may be utilized with another application/service offering the aforementioned communication processes, for example, a social networking application/service. In various embodiments, catalog application 120 may provide communication with mobile merchant 140, where mobile merchant 140 is utilized to provide delivery for an item ordered by user 102. For example, catalog application 120 may provide a location of user 102 to mobile merchant 140 and alert services to user 102 of an arrival of mobile merchant 140. This may occur over network 170 and/or a short range wireless network (e.g. Bluetooth Low Energy (BLE), including a BLE beacon with the mobile merchant).

User 102 may further utilize catalog application 120 to enter payment options for storage by user device 110, provide payment for an item with merchant server 130 and/or payment provider server 150, and complete the payment request for the item selected from the catalog with merchant server 130 and/or payment provider server 150. In certain embodiments, Catalog application 120 may correspond more generally to a web browser configured to view information available over the Internet or access a website corresponding to payment provider server 150. In such embodiments, the browser may enable downloading of the catalog of items from payment provider server 150 for viewing in an offline mode when user device 110 is not connected to network 170.

Catalog application 120 may utilize user financial information, such as a credit card, bank account, or other financial account, to generate and/or complete purchase requests. In other embodiments, catalog application 120 may provide payment for items using a user account with payment provider server 150. Catalog application 120 may include cross-linking, allowing user 102 to identify a separate user account, for example, identifying a user account through a debit card account number. Catalog application 120 may further include options to store transaction histories for purchased items, such as receipts, for later use. Thus, catalog application 120 provides an interface enabling user 102 to provide proof of purchase of an item to a merchant location corresponding to merchant server 130 and/or mobile merchant 140.

Calendar application 112 may be configured to provide calendaring and scheduling services to user 102. In various embodiments, calendar application 112 includes a user interface presenting schedules, including daily, weekly, monthly, and/or yearly schedules, of upcoming events of user 102. Information stored in calendar application 112 may be input from user 102 and/or through another application. For example, user 102 may input upcoming travel schedules or may receive the input from an email, travel application, or other source. In various embodiments, calendar application 112 may include location and/or mapping services that may include current locations of user 102, destination locations of user 102, or other location information. Calendar application 112 may be utilized by catalog application 120 to determine user preferences corresponding to times of travel of user 102 and locations of travel. In other embodiments, location services may be offered by a separate application of user device 110.

User device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 170, or other types of applications. Other applications 114 may also include email, texting, voice, IM, and/or social networking applications that allow a user to send and receive emails, calls, texts, messages, postings, and other notifications through network 170. In various embodiments, other applications 114 may include financial applications, such as banking, online payments, money transfer, or other applications associated with payment provider server 150. Additionally, other application may include browser applications, mapping/check-in applications, and/or social networking applications when not provided by catalog application 120. Other applications 114 may contain other software programs, executable by a processor, including a graphical user interface (GUI) configured to provide an interface to the user.

User device 110 may further include database 116 which may include, for example, identifiers such as operating system registry entries, cookies associated with catalog application 120, calendar application 112 and/or other applications 114, identifiers associated with hardware of user device 110, or other appropriate identifiers, such as identifiers used for payment/user/device authentication or identification. In one embodiment, identifiers in database 116 may be used by user device 110, merchant server 130, and/or payment provider server 150, to associate user device 110 with a particular account maintained by merchant server 130 and/or payment provider server 150.

Database 116 may include user personal information (e.g. a name, social security number, user financial information, or other identifying information), a user account identifier (e.g. user account identifier is at least one of a user identifier, a user credit or debit card number, a user account name, and a user account number), and/or a user device identifier that may be utilized to identify user 102 and/or complete purchase requests. In various embodiments, database 116 may include online account access information. Database 116 may store user preference from user input, various applications of user device 110, and/or scrapped from sources such as other applications, online user accounts/profiles, etc. Database 116 may include generated purchase requests by user 102 using a catalog of catalog application 120. For example, where user device 110 does not possess network connectivity, database 116 may store purchase requests, Database 116 may further include travel and/or calendar information corresponding to calendar application 112. Database 116 may include transaction histories usable to present proof of purchase to merchant server 120.

In various embodiments, user device 110 includes at least one network interface component 118 adapted to communicate with merchant server 130 payment provider server 150. Network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices. In various embodiments, network interface component 118 may include a communication module for short range communications with mobile merchant 140 including microwave, radio frequency, infrared, Bluetooth, and near field communication devices.

Merchant server 130 may be maintained, for example, by a merchant or seller offering various items (e.g., goods, products, events, and/or services) through an online site or application. In certain embodiments, merchant server 130 may include a corresponding merchant location for redemption of an item purchase (e.g. a merchant storefront, venue, etc.). Generally, merchant server 130 may be maintained by anyone or any entity that receives money, which includes charities as well as retailers and restaurants. In this regard, merchant server 130 may include processing applications, which may be configured to interact with user device 110 and payment provider server 150 to facilitate the sale of items. In various embodiments, merchant server 130 may correspond to EBAY®, Inc. of San Jose, Calif., USA. However, in other embodiments, merchant server 130 may correspond to any merchant offering items and/or services to user 102. Merchant server 130 may further include or correspond with mobile merchant 140 to facilitate the delivery of goods. Merchant server 130 may include applications to facilitate the exchange of money and the transmission of transaction histories to the purchaser.

Merchant server 130 may be implemented using any appropriate hardware and software configured for wired and/or wireless communication with user device 110, mobile merchant 140, and/or payment provider server 150. For example, in one embodiment, merchant server 130 may be implemented as a single or networked server computing system, personal computer (PC), a smart phone, personal digital assistant (PDA), laptop computer, and/or other types of computing devices capable of transmitting and/or receiving data. Although a merchant server is shown, the merchant server may be managed or controlled by any suitable processing device. Although only one merchant server is shown, a plurality of merchant servers may be utilized Merchant server 130 includes a marketplace application 132, a database 134, and a network interface component 136. Marketplace application 132 may correspond to processes, procedures, and/or applications executable by a hardware processor, for example, a software program. In other embodiments, merchant server 130 may include additional or different software as required.

Marketplace application 132 may correspond to an application to serve information to user device 110 and/or payment provider server 150 over network 170. In various embodiments, user 102 may interact with marketplace application 132 to view various items available for purchase from merchant server 130. Thus, marketplace application 132 may include a marketplace interface displayable on user device 110. In various embodiments, marketplace application 132 may correspond to a marketplace where a plurality of users and/or merchants may sell items. Thus, marketplace application 132 may offer services similar to EBAY®, Inc. of San Jose, Calif., USA. However, marketplace application 132 may correspond more generally to any application enabling merchant server 130 to offer items for sale to user 102. Items available from marketplace application 132 may correspond to any products, goods, services, event admissions, or other available items.

Marketplace application 132 may include items for sale, purchase prices of the items, inventory of the items, and/or terms of purchase. Marketplace application 132 may further track information about sales and prices of items available with merchant server 130. For example, marketplace application 132 may adjust and/or track sale prices and inventory levels as purchases are made.

In addition to being accessible directly by user device 110, marketplace application 132 may be utilized by payment provider server 150 (through accessing an API of marketplace application 132), to create catalogs of items for transmission to user device 110. For example, payment provider server 150 may request/receive inventory levels, sale prices, discounts, or other information for an item from marketplace application 132. Marketplace application 132 may also be configured to interact with payment provider server 150 to complete purchase requests for items available with marketplace application 132.

Merchant server 130 includes a database 134 identifying available products, goods, and/or services (e.g., collectively referred to as items) which may be made available for viewing and purchase by user 102 using marketplace application 132 and/or through a catalog provided by payment provider server 150. Database 134 may include tracking numbers for the items, stock amounts, prices, and other item information. Database 134 may further include analytics of items, such as high trending items (e.g. large amount of purchases, searches, items with discounts, etc.), price variations including price predictors, inventory levels, and/or other desired item information. Information in database 134 may be utilized by payment provider server 150 in creating catalogs, as will be explained in more detail herein.

In various embodiments, merchant server 130 includes at least one network interface component 136 adapted to communicate with user device 110, mobile merchant 140, and/or payment provider server 150. Network interface component 136 may include a DSL (e.g., Digital Subscriber Line) modem, a PSTN (Public Switched Telephone Network) modem, an Ethernet device, a broadband device, a satellite device and/or various other types of wired and/or wireless network communication devices. In various embodiments, network interface component 136 may include a communication module for short range communications with mobile merchant 140 including microwave, radio frequency, infrared, Bluetooth, and near field communication devices for communication.

Mobile merchant 140 may correspond to a merchant and/or merchant server offered and/or retained by merchant server 130 and providing delivery services to user 102. Mobile merchant 140 may correspond to a delivery merchant and/or courier in various embodiments. Merchant server 130 may utilize mobile merchant 140 to deliver one or more items purchased from a catalog to user 102. Merchant server 130 may provide location and delivery information for user 102 to mobile merchant 140. However, in other embodiments, mobile merchant 140 may communicate with user 102 through user device 110 to arrange delivery of the items.

Payment provider server 150 may be maintained, for example, by an online payment service provider, which may provide catalog generation and payment services on behalf of user 102 and other users. In this regard, payment provider server 150 includes one or more processing applications, which may provide payment for items between user device 110 and merchant server 130. In one example, payment provider server 150 may be provided by PAYPAL®, Inc. of San Jose, Calif., USA. However, in other embodiments, payment provider server 150 may be maintained by or include a merchant, financial services provider, and/or other service provider, which may provide catalog, user account, and payment services to user 102. Although payment provider server 150 is described as separate from merchant server 130, it is understood that merchant server 130 may include services offered by payment provider server 150.

Payment provider server 150 of FIG. 1 includes a catalog determination application 160, a transaction processing application 152, other applications 154, a database 156, and a network interface component 158. Catalog determination application 160, transaction processing application 152, and other applications 154 may correspond to processes, procedures, and/or applications executable by a hardware processor, for example, a software program. In other embodiments, payment provider server 150 may include additional or different software as required.

Payment provider server 150 includes catalog determination application 160, which may be configured to generate at least one catalog for user 102, wherein the catalog(s) include at least one item available from one or more merchants, such as merchant server 130. In this regard, catalog determination application 160 may be configured to receive information from marketplace application 132 (for example through accessing an API of marketplace application 132 and requesting/receiving information) corresponding to an item available with merchant server 130. Information received from marketplace application 132 may correspond to one or more items, item descriptions, item pricings, item inventory levels, or other item sales information.

In various embodiments, catalog determination application 160 may personalize item information request to user 102. Catalog determination application 160 may request item information about high trending items (e.g. items with large sales, searches, discounts, etc.), about specific categories of items, or about items corresponding to user preferences for items in a catalog. For example, catalog determination application 160 may request information for items of high trends across various merchant verticals (e.g. vehicles, fashion, electronics, etc.).

In another example, user preferences may guide information requests. User preferences may correspond to input by user 102, or user preferences determined from information corresponding to user 102. Information corresponding to user 102 may correspond to past purchases by user 102, travel or location information about user 102 (e.g. a travel destination, information about a location of user 102 such as weather, etc.), or other user information. For example, if user 102 is about to board a plane, user preferences may correspond to items available in a duty free shop at an airport, in an airline catalog, about a destination of user 102, or other travel preference. A current user location and/or destination user location may be utilized to determine both items in a catalog and merchants offering the items in the catalog. Item's added to a catalog may be specific to a user location, such as location specific clothing, food/restaurant purchases, regional sales, etc. Additionally, the merchants offering items for sale in the catalog may correspond to a current location and/or destination location of the user to ensure timely pick-up or delivery of an item ordered by the user. For example, items offered from a local merchant to a travel destination of user 102 may be added with information about the merchant (e.g. a merchant location). Thus, user 102 may generate purchase requests from the local merchant when user 102 is travelling to or arrives at the travel destination and pick-up or have delivered the item(s).

Previous user searches may also be used to guide item information requests by retrieving items of particular interest to user 102. In various embodiments, catalog determination application 160 may only receive information about items having fixed prices and large inventories to avoid denying a purchase request generated while user device 110 is offline. However, predictive analysis of item prices and inventories may also be utilized to provide average prices and/or catalog determination application 160 may include waivers/warnings that item information may fluctuate.

Once salient item information corresponding to user 102 has been received by catalog determination application 160, catalog determination application 160 may create a catalog for transmission to user device 110. A catalog may correspond to a listing of one or more items for sale from merchant server 130. The catalog may include additional information, such as item description, item price, item inventory amount with merchant server 130, etc. The catalog may contain additional information including comparisons of item prices, delivery times, etc. with a plurality of merchants. Once the catalog has been determined, the catalog may be transmitted to user device 110 for display to user 102 through catalog application 120.

Catalog determination application 160 may transmit the catalog to user device 110 prior to user device 110 losing network connectivity. In various embodiments, the catalog may be transmitted and updated to user device 110 at intervals during network connectivity of user device 110. Additionally, catalog determination application 160 may receive information about user 102 that may determine times when user device 110 will lose network connectivity. For example, a schedule of an upcoming trip may determine that user device 110 will lose network connectivity during a plane flight from 3:30 PM-8:00 PM on 11/25. Thus, catalog determination application 160 may transmit and/or update the catalog on user device 110 prior to this time. In other embodiments, catalog determination application 160 may utilize location information, including destination location information, and a service plan map of user device 110 to determine if user device 110 will lose network connectivity.

As previously discussed, catalog determination application 160 may receive a purchase request generated by user 102 while user device is in an offline mode. The purchase request may be received when user device 110 reconnects to network 170. If catalog determination application 160 determines the terms of the purchase request can be met with merchant server 130 (e.g. price and stock of an item is still offered), then payment provider server 150 may utilize transaction processing application 150 to complete the purchase request, as will be explained in more detail herein.

However, in other embodiments, the purchase request may no longer include a valid price and/or inventory level of the item with merchant server 130. Thus, catalog determination application 160 may either deny the purchase request or may generate an updated purchase request including a new price and a new inventory level for transmission to user device 110. For example, user 102 may utilize catalog application 120 to generate a purchase request for an item in a catalog on user device 110 when user device 110 is not connected to network 170. Thus, when user device 110 reconnects to network 170, the purchase request with a price and/or requested amount may be transmitted to payment provider server 150. If price of the item and/or inventory of the item has changed between when the item was added to the catalog on user device 110 and when the purchase request was transmitted to payment provider server 150, payment provider server 150 may transmit an updated purchase request with a new price and/or inventory level to user device 110. User 102 may view the updated purchase request through catalog application 120 and accept or decline the updated purchase request.

When user device 110 reconnects to network 170, catalog determination application may also update the catalog on user device 110. Updating the catalog may include transmitting a new catalog to user device 110, adding/removing items from an existing catalog on user device 110, and/or changing item information in the catalog on user device 110. Updating the catalog may further include additional user preferences for user 102 determined while user device 110 is disconnected from network 170.

Transaction processing application 152 may be configured to receive information from user device 110 and/or merchant server 130 for processing and completion of financial transactions corresponding to purchase requests for items from a catalog. Transaction processing application 152 may include one or more applications to process financial information included in purchase requests from user device 110 and/or merchant server 130. Financial information may correspond to user debit/credit card information, checking account information, a user account (e.g. payment account with payment provider server 150), or other payment information. Transaction processing application 152 may complete the financial transaction for the purchase request by providing payment to merchant server 130. In various embodiments, transaction processing application 132 may provide transaction histories, including receipts, to user device 110 in order to provide proof or purchase to a merchant location corresponding to merchant server 130 for completion of the financial transaction and retrieval of the item. Transaction processing application 152 may also provide the transaction histories to mobile merchant 140 for use in delivery of the item.

In various embodiments, payment provider server 150 includes other applications 154 as may be desired in particular embodiments to provide features to payment provider server 150. For example, other applications 154 may include security applications for implementing server-side security features, programmatic server applications for interfacing with appropriate application programming interfaces (APIs) over network 170, or other types of applications. Other applications 154 may contain software programs, executable by a processor, including a graphical user interface (GUI), configured to provide an interface to a user.

Additionally, payment provider server 150 includes database 156. As previously discussed, user 102 may establish one or more user accounts with payment provider server 150. User accounts in database 156 may include user information, such as name, address, birthdate, payment/funding information, additional user financial information, and/or other desired user data. User 102 may link user accounts to user device 110 through a user device identifier. Thus, when a device identifier corresponding to user device 110 is transmitted to payment provider server 150, e.g. from user device 110 and/or merchant server 130, a user account belonging to user 102 may be found. In other embodiments, user 102 may not have previously established a user account and may utilize an account management application of payment provider server 150 to create one during completion of the purchase request. Database 156 may also store item information for use in creating catalogs for user 102 and/or user preference information.

In various embodiments, payment provider server 150 includes at least one network interface component 158 adapted to communicate with network 170 including user device 110, merchant server 130, and/or mobile merchant 140. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2A:
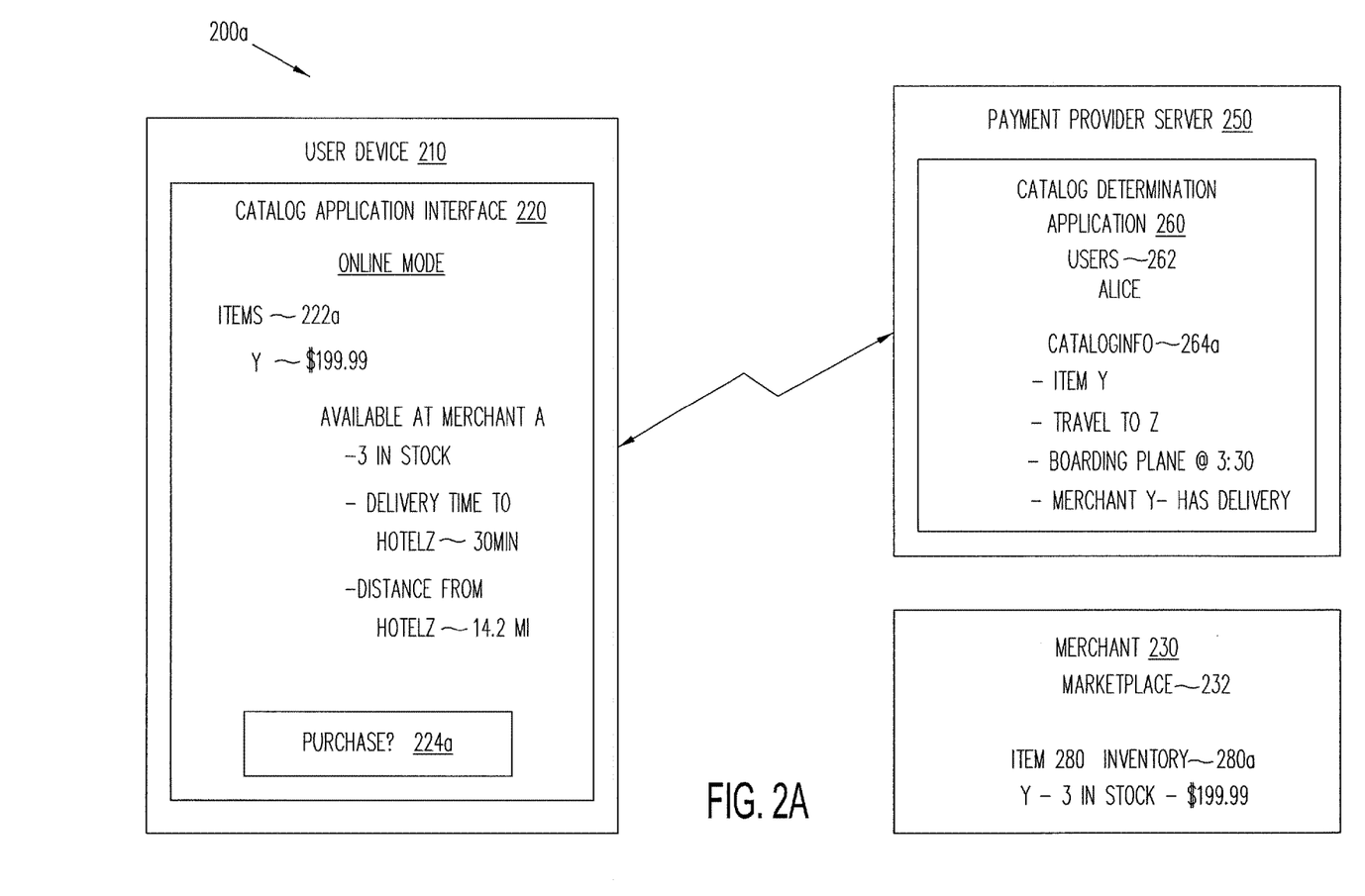
FIG. 2A is an exemplary user interface displaying a catalog for a user while the user is in an online mode with a server, according to an embodiment.

FIG. 2A is an exemplary user interface displaying a catalog for a user while the user is in an online mode with a server, according to an embodiment. Environment 200a of FIG. 2A includes a user device 210, a merchant 230, and a payment provider server 250 corresponding generally to user device 110, merchant 130, and payment provider server 150, respectively, of FIG. 1. Additionally, catalog application interface 220 and catalog determination application 260 of FIG. 2A may display processes corresponding generally to the described functions of item catalog application 120 and catalog determination application 260, respectively, of FIG. 1.

In environment 200a of FIG. 2A, a user, "Alice," of user device 210 may view catalog application interface 220 in an "online mode." The online mode may correspond to user device 210 having a network connection enabling simultaneous (e.g. bidirectional) communication with payment provider server 250. Thus, user device 210 may send and receive data over a network. User device 210 may transmit user preferences to payment provider server 250 for use in determining a catalog for the user of user device 210. The user preferences may include user input, user location, and/or user travel information.

Merchant 230 may transmit item information to payment provider server 250. Merchant 230 includes marketplace 232, which may correspond to a service enabling one or more users and/or merchants to offer items for sale. Marketplace 232 includes item 280 and inventory 282a. Item 280 includes item Y for sale from a merchant 230. Additionally, inventory 282a includes an inventory level for item Y and a current price.

Payment provider server 250 may determine a catalog including at least one item for sale from merchant 230. Payment provider server 250 includes catalog determination application 260, which may include information of users 262 and catalog information 264a. Users 262 include one user "Alice" (corresponding to user device 210) utilizing catalog services of payment provider server 250. Users 262 may further include a plurality of other users subscribing to the catalog services as well. Catalog information 264a may correspond both to information for users 262 from user device 110, such as user preferences, and item information from merchant 230. Catalog information 264a includes a desired item by Alice, item Y. Additionally, catalog information 264a includes travel plans of Alice and information about merchant 230's delivery services. Using received user preferences of users 262 in catalog information 264a, payment provider server 250 may request item information from merchant 230 (e.g. item 280 and inventory 282a) for use in determining the catalog.

After determining the catalog for Alice, catalog determination application 260 may transmit the catalog to user device 210. Catalog determination application 260 may further utilize information about travel plans for users 262 to determine when to transmit the catalog to user device 210. For example, catalog determination application 260 receives information detailing that Alice will board a flight at 3:30 that day. Thus, catalog determination application 260 should transmit and/or update the catalog on user device 210 prior to that time.

Once the catalog is received by user device 210, catalog application interface 220 may display the catalog to Alice. The catalog displayed in catalog application interface 220 includes items 222a with item information, including price and inventory level. Additionally, catalog application interface 220 includes a purchase button 224a, which may correspond to a process to initiate generation and transmission of a purchase request for items 222a to payment provider server 250. Since Alice has yet to board the flight and thus lose network connectivity to payment provider server 250, catalog application interface 220 operates in an online mode and the purchase request may be immediately transmitted to payment provider server 250 for completion of a financial transaction for items 222a according to the terms described for items 222a. Thus, selection of purchase button 224a may initiate a process for payment provider server 250 to complete the transaction with merchant 230. Additionally, Alice may select from the options provided with items 222a, such as an inventory level, delivery option to a "Hotel Z," and/or pick up from merchant Y corresponding to merchant 230 (e.g. a merchant location).

Figure 2B:
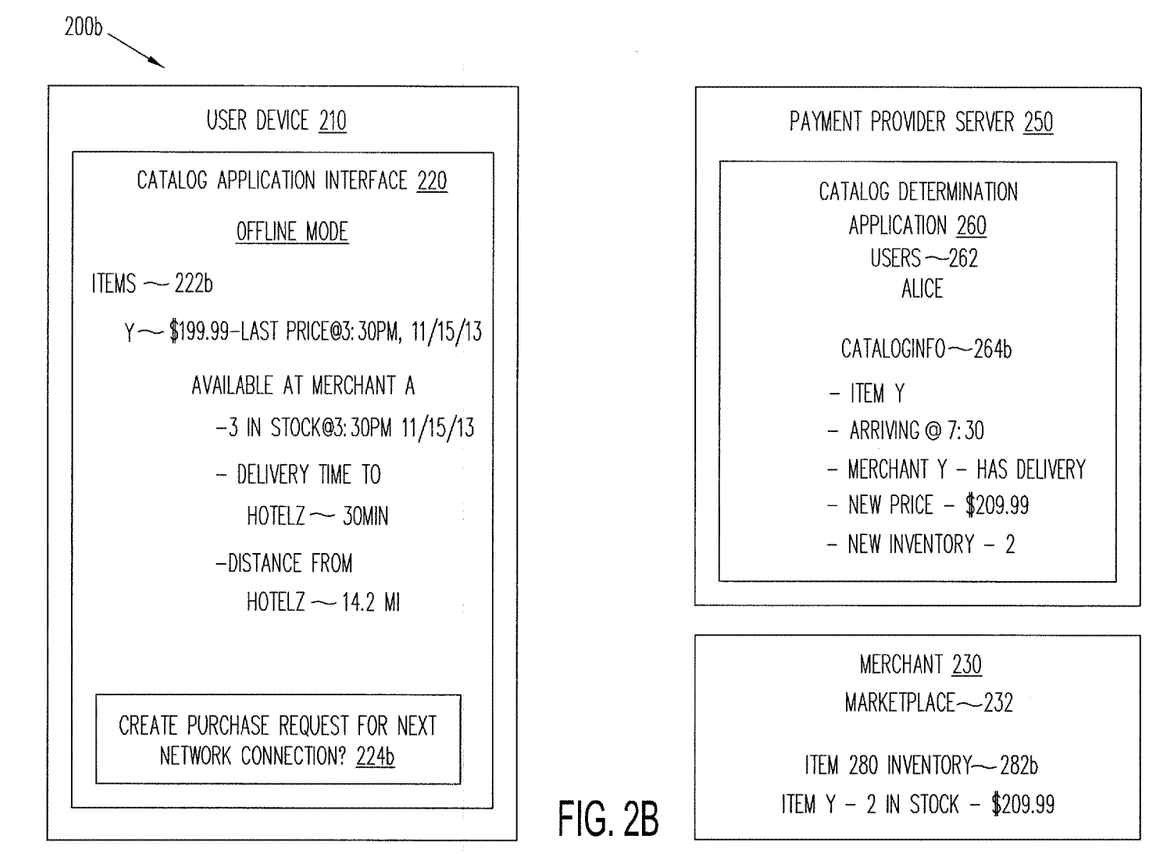
FIG. 2B is an exemplary user interface displaying a catalog for a user enabling the user to shop for items in the catalog while the user is in an offline mode, according to an embodiment.

FIG. 2B is an exemplary user interface displaying a catalog for a user enabling the user to shop for items in the catalog while the user is in an offline mode, according to an embodiment. Environment 200b of FIG. 2B includes a user device 210, a merchant 230, and a payment provider server 250 corresponding generally to user device 110, merchant 130, and payment provider server 150, respectively, of FIG. 1. Additionally, catalog application interface 220 and catalog determination application 260 of FIG. 2B may display processes corresponding generally to the described functions of item catalog application 120 and catalog determination application 260, respectively, of FIG. 1.

FIG. 2B presents a similar environment 200b to environment 200a of FIG. 2A. However, in the exemplary embodiment of FIG. 2B, environment 200b displays an embodiment where user device 210 does not have network connectivity to transmit and receive information. Thus, catalog application interface 220 operates in an "offline mode," denoting that while no network connectivity exists for user device 210, items may still be viewed in the catalog of catalog application interface 220 and a purchase request queued so that it will be transmitted when user device 210 reconnects to a network.

In environment 200b of FIG. 2B, a user (e.g. "Alice from FIG. 2A) of user device 210 is in an area/situation where user device 210 is not connected to a network enabling communication with merchant 230 and/or payment provider server 250. For example, user device 210 may be at a location where service coverage corresponding to a wireless communication network is low or does not cover. In another embodiment, the user (Alice) utilizing user device 210 may turn off a network connection of user device 210, such as when boarding a plane.

While user device 210 operates in the offline mode, Alice may still utilize catalog application interface 220 to view the catalog. Items 222b of catalog application interface 220 includes information from the previously received catalog in environment 200a of FIG. 2A. Items 222b display the item information for item Y and a time the item information was last received. For example, items 222b include a last price of item Y received when user device 210 went offline at 3:30 (e.g. when boarding the place as described with respect to FIG. 2A). Additionally, items 222b include the inventory information available for the item with merchant 230 and the time the inventory information was last received. Items 222b also display merchant information for merchant 230, including delivery and pick up information, similar to environment 200a of FIG. 2A.

If Alice decides to purchase item Y in items 222b, Alice may select purchase button 224b in catalog application interface 220. Purchase button 224b may then generate a purchase request for item Y. However, in environment 200b, user device 210 does not have network connectivity to immediately transmit the purchase request. Thus, user device 210 may store the purchase request for later transmission to payment provider server 250. When user device 210 reconnects to a network, the purchase request may be transmitted to payment provider server 250.

In environment 200b of FIG. 2B, merchant 230 has also changed the pricing of item Y. In various embodiments, payment provider server 250 may be configured to only utilize items in a catalog of high inventory levels and/or static prices. However, in other embodiments (e.g. FIG. 2B), payment provider server 250 may add items in the catalog displayed in catalog application interface 220 that may fluctuate in price and inventory level. Thus, merchant 230 transmits inventory 282b in marketplace 232 to payment provider server 250. Payment provider server 250 may utilize new information in catalog info 264b of catalog determination application 260 to update the catalog on user device 210 when user device 210 establishes a connection to a network.

In addition to updating the catalog on user device 210 with a new price and a new inventory of item Y when user device 210 reconnects to a network, catalog determination application 260 may contain information for users 262 in catalog information 264b that corresponds to users 262 destination location and arrival time. Catalog determination application 260 may find additional items matching these user preferences. Catalog information 264a may also contain information of an expected time where user device 210 may have network connectivity in order to prepare the catalog updates.

If a purchase request transmitted by user device 210 contains terms of sale that are no longer valid with merchant 230 (e.g. merchant 230 has updated a price/inventory of an item, as in environment 200b), catalog determination application 260 may transmit an updated purchase request back to user device 210 for confirmation by Alice using user device 210. The updated purchase request may include a new price for an item and/or a new inventory level for the item.

Figure 3:
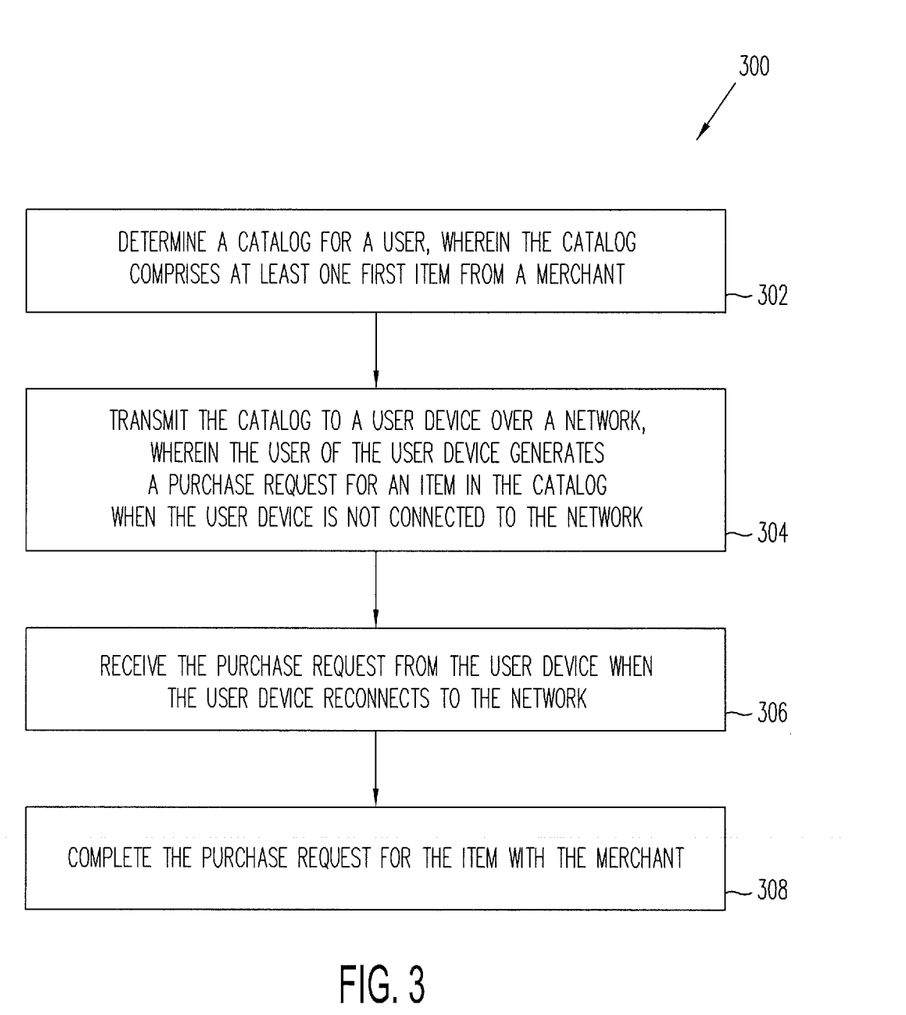
FIG. 3 is a flowchart of an exemplary process for determining and transmitting a catalog to a user for use when the user is not connected to a network, according to an embodiment.

FIG. 3 is a flowchart of an exemplary process for determining and transmitting a catalog to a user for use when the user is not connected to a network, according to an embodiment. Note that one or more steps, processes, and methods described herein may be omitted, performed in a different sequence, or combined as desired or appropriate.

A catalog for a user may be determined, at step 302, wherein the catalog comprises at least one first item from a merchant. The catalog may correspond to a list of items available for sale from the merchant, and may include items highly trending across the merchant's verticals (e.g. items of high search, purchase, etc. across the merchant's automobiles, fashion, electronics, etc.). Items added to the catalog may also correspond to user preferences and/or predicted user preferences, including information determined from user input, previous user purchases, user location, and/or user travel arrangements. In various embodiments, items of interest to a user may be added to the catalog based on predicted shopping a user may wish to engage in while a user device is not connected to a network. For example, a user on a plane may browse an inflight shopping magazine. Thus, items in the catalog may correspond to items available in the magazine. The catalog may further contain a first price and/or first inventory of the at least one first item with the merchant.

At step 304, the catalog is transmitted to a user device over a network, wherein the user of the user device generates a purchase request for an item in the catalog when the user device is not connected to the network. The catalog may be transmitted an update while the user device has network connectivity. Additionally, based on information know about a user, a user's location, and/or a user's calendar/schedule (e.g. travel plans, meeting plans, etc.), a predicted time when the user device will no longer have network connectivity may be determined. This predicted time can be utilized to determine when a catalog and/or update are transmitted to the user device.

While the user device is operating with a network connection, purchase requests may be transmitted by the user device to a payment provider server for completion with a merchant. However, when the user device loses the network connection, the catalog may be viewable by a user of the user device with the most recent item information received prior to losing the network connection. The user may then generate a purchase request for one or more items in the catalog and establish a time to transmit the purchase request when the user device reconnects to a network.

The purchase request is received from the user device when the user device reconnects to the network, at step 306. The purchase request may be transmitted immediately when the user device reconnects to the network, on user approval of transmission, or at another time specified by the user. Additionally, the purchase request for the item may be completed with the merchant, at step 308.

In various embodiments, a second price and/or a second inventory for the at least one first item may be determined. The second price and second inventory may be used to update the catalog. Where the user device is not connected to a network when the second price and/or second inventory is determined, the catalog may be updated with the second price and/or second inventory when the user device reconnects to the network.

In various embodiments, at least one second item may be determined for the user, for example, using user preferences (e.g. user input, user location, etc.). The catalog may be updated with the at least one second item. If the user device is not connected to a network at the time the at least one second item is determined, the catalog may be updated with the at least one second item when the user device reconnects to the network.

In various embodiments, a location of the user may be received. The location may correspond to a current location and/or a destination location (e.g. a location in a schedule of the user). Using the user location, a merchant location corresponding to the merchant offering the at least one first item may be determined. If the merchant location is in proximity to the user location, the merchant location may be transmitted to the user device. For example, items loaded to the catalog may depend on user location by corresponding to items offered by a merchant at the user current location and/or at the user destination location. Thus, timely pick-up or delivery of items in the catalog can be assured by utilizing items and/or merchant local to the user. In certain embodiments, a transaction history corresponding to the completion of the purchase request may be transmitted to the merchant for use in completing the transaction and arranging pick-up of the item or delivery of the item using a mobile merchant.

In another embodiment, the service provider may arrange to have the purchase delivered to a destination of the user. For example, if the service provider knows when the user will be landing or otherwise arriving at a city, it can estimate a time when the user will be at a delivery location, such as a hotel or office. The estimation can be based on distance between the arrival location and the delivery location, traffic, time to get out of the airport (factoring in getting luggage if applicable, going through customs, etc.), and other factors.

Figure 4:
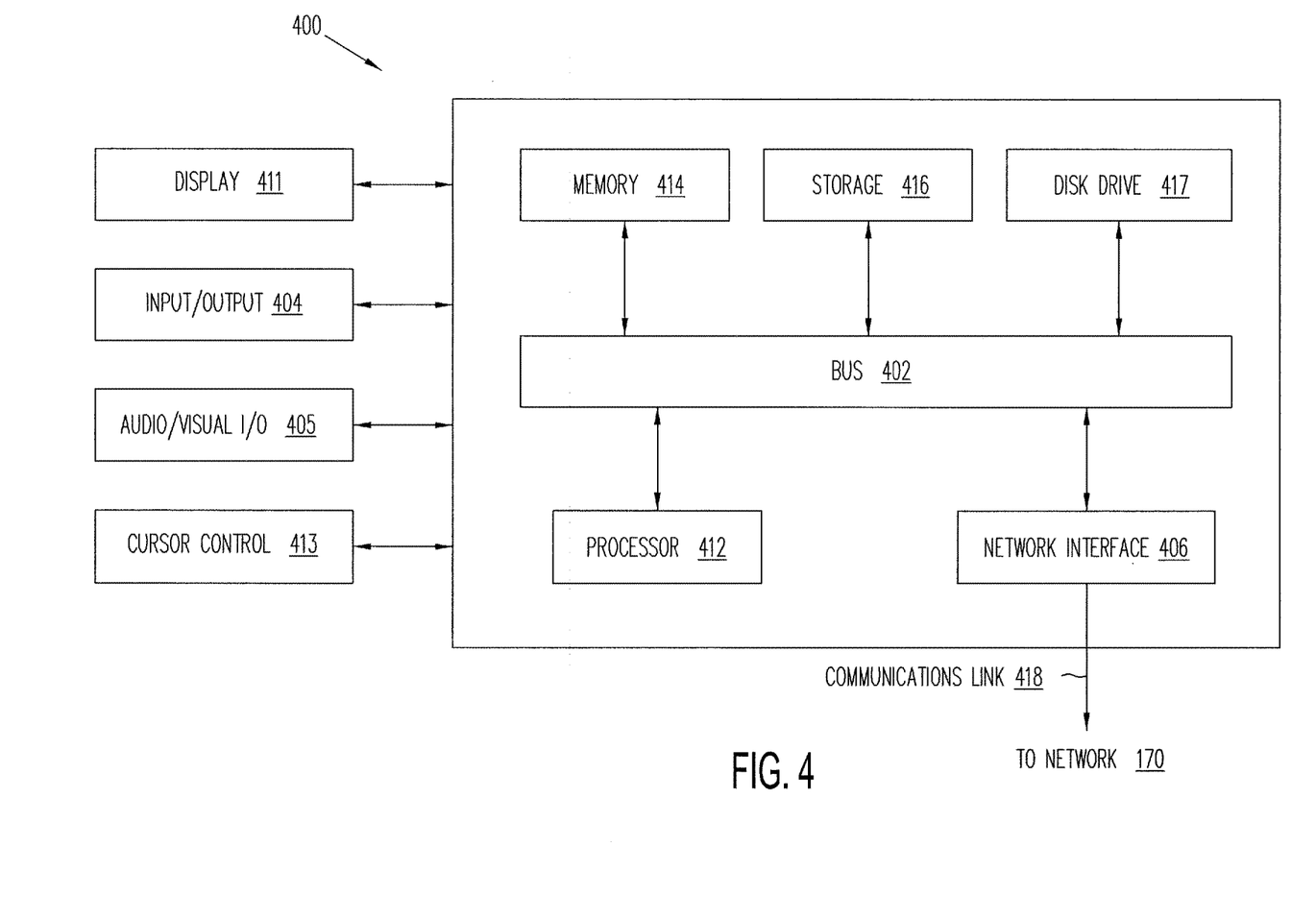
FIG. 4 is a block diagram of a computer system suitable for implementing one or more components in FIG. 1, according to an embodiment.

FIG. 4 is a block diagram of a computer system suitable for implementing one or more components in FIG. 1, according to an embodiment. In various embodiments, the user device may comprise a personal computing device (e.g., smart phone, a computing tablet, a personal computer, laptop, PDA, Bluetooth device, key FOB, badge, etc.) capable of communicating with the network. The merchant server and/or service provider may utilize a network computing device (e.g., a network server) capable of communicating with the network. It should be appreciated that each of the devices utilized by users and service providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons, image, or links, and/or moving one or more images, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a service provider server via network 170. In one embodiment, the transmission is wireless, although other transmission mediums and methods may also be suitable. One or more processors 412, which can be a micro-controller, digital signal processor (DSP), or other processing component, processes these various signals, such as for display on computer system 400 or transmission to other devices via a communication link 418. Processor(s) 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor(s) 412 and other components by executing one or more sequences of instructions contained in system memory component 414. Logic may be encoded in a computer readable medium, which may refer to any medium that participates in providing instructions to processor(s) 412 for execution. Such a medium may take many forms, including but not limited to, non-volatile media, volatile media, and transmission media. In various embodiments, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
  a non-transitory memory; and
  one or more hardware processors coupled to the non-transitory memory and configured to read instructions from the non-transitory memory to cause the system to perform operations comprising:
    determining a first item at a first price using application programming interfaces (APIs) of online marketplaces for a plurality of merchants;
    determining a price stability of the first price and an inventory level of the first item on the online marketplaces for the plurality of merchants;
    generating a digital representation of the first item for output through an application of a user device of a user, wherein the digital representation comprises data for a sale of the first item in a catalog of items displayed by the application when the user device is disconnected from a network based on the price stability and the inventory level;
    determining that the user device is connected to the network via a network connection of the user device to the system;
    transmitting the digital representation to the user device over the network via the network connection prior to a disconnection of the user device from the system, wherein the digital representation causes output of the data for the sale of the first item in the catalog when the user device lacks the network connection to the system, and wherein the digital representation displays or hides the first price based on the price stability and the inventory level when the user device lacks the network connection;
    in response to the user device reconnecting to the system through the network, receiving a purchase request stored on the user device when the user device reconnects to the system, wherein the purchase request was previously generated for the first item in the catalog of the application without the network connection of the user device and delayed from transmission until the user device reconnects to the system;
    determining a merchant from the plurality of merchants in closest proximity to a destination location of the user;
    in response to receiving a second price for the first item from the merchant, transmitting, to the user device, an approval request of the purchase request of the first item for the second price, wherein the second price comprises a price change occurring during the disconnection of the user device from the system; and
    processing the purchase request for the first item with the merchant based on a response to the approval request from the user.

2. The system of claim 1, wherein the operations further comprise:
  determining a second item for the user; and updating the catalog in the user device using the second item when the user device is connected to the network.

3. The system of claim 1, wherein the catalog further displays the inventory level with the merchant of the first item.

4. The system of claim 3, wherein the operations further comprise:
determining a change in the inventory level with the merchant of the first item; and
in response to the user device reconnecting to the system through the network and receiving the approval request to transmit a purchase request stored to the user device, updating the catalog with the change.

5. The system of claim 1, wherein the operations further comprise:
determining user preferences for the catalog, wherein the user preferences are determined using at least one of user preference input, past user purchases, user travel arrangements for upcoming travel, or a user location,
wherein the first item is determined using the user preferences.

6. The system of claim 1, wherein the operations further comprise:
determining a time when the user device will not have the network connection to the network,
wherein the digital representation is transmitted to the user device prior to the time.

7. The system of claim 6, wherein the time is determined using at least one of a schedule of the user in a calendar application or a location of the user.

8. The system of claim 1, wherein the operations further comprise:
receiving a user location of the user;
determining if a merchant location of the merchant offering the first item is within a first distance to the user location; and
transmitting the merchant location to the user device if the merchant location is within the first distance to the user location.

9. The system of claim 8, wherein the user location is the destination location of the user from a schedule of the user in a calendar application.

10. The system of claim 9, wherein the operations further comprise:
transmitting a transaction history for the purchase request to the merchant.

11. A method comprising:
determining, using one or more hardware processors of a server, a first item at a first price using application programming interfaces (APIs) of online marketplaces for a plurality of merchants;
determining a price stability of the first price and an inventory level of the first item on the online marketplaces for the plurality of merchants;
generating a digital representation of the first item for output through an application of a user device of a user, wherein the digital representation comprises data for a sale of the first item in a catalog of items displayed by the application when the user device is disconnected from a network based on the price stability and the inventory level;
determining that the user device is connected to the network via a network connection of the user device to the server;
transmitting the digital representation to the user device over the network via the network connection prior to a disconnection of the user device from the server, wherein the digital representation causes output of the data for the sale of the first item in the catalog when the user device lacks the network connection to the server, and wherein the digital representation displays or hides the first price based on the price stability and the inventory level when the user device lacks the network connection;
in response to the user device reconnecting to the server through the network, receiving a purchase request stored on the user device when the user device reconnects to the server, wherein the purchase request was previously generated for the first item in the catalog of the application without the network connection of the user device and delayed from transmission until the user device reconnects to the server;
determining a merchant from the plurality of merchants in closest proximity to a destination location of the user;
in response to receiving a second price for the first item from the merchant, transmitting, to the user device, an approval request of the purchase request of the first item for the second price, wherein the second price comprises a price change occurring during the disconnection of the user device from the server; and
processing the purchase request for the first item with the merchant based on a response to the approval request from the user.

12. The method of claim 11 further comprising:
determining a second item for the user; and
updating the catalog in the user device using the second item when the user device is connected to the network.

13. The method of claim 11, wherein the catalog further displays the inventory level with the merchant of the first item.

14. The method of claim 13 further comprising:
determining a change in the inventory level with the merchant of the first item; and
in response to the user device reconnecting to the server through the network and receiving the approval request to transmit a purchase request stored to the user device, updating the catalog with the change.

15. The method of claim 11 further comprising:
determining user preferences for the catalog, wherein the user preferences are determined using at least one of user preference input, past user purchases, user travel arrangements for upcoming travel, or a user location,
wherein the first item is determined using the user preferences.

16. The method of claim 11 further comprising:
determining a time when the user device will not have the network connection to the network,
wherein the digital representation is transmitted to the user device prior to the time.

17. The method of claim 16, wherein the time is determined using at least one of a schedule of the user in a calendar application or a location of the user.

18. The method of claim 11 further comprising:
receiving a user location of the user;
determining if a merchant location of the merchant offering the first item is within a first distance to the user location; and
transmitting the merchant location to the user device if the merchant location is within the first distance to the user location.

19. The method of claim 11 further comprising:
transmitting the transaction history for the purchase request to the merchant.

20. A non-transitory computer readable medium having stored thereon machine-readable instructions executable by a machine to perform operations comprising:

determining a first item at a first price using application programming interfaces (APIs) of online marketplaces for a plurality of merchants;

determining a price stability of the first price and an inventory level of the first item on the online marketplaces for the plurality of merchants;

generating a digital representation of the first item for output through an application of a user device of a user, wherein the digital representation comprises data for a sale of the first item in a catalog of items displayed by the application when the user device is disconnected from a network based on the price stability and the inventory level;

determining that the user device is connected to the network via a network connection of the user device to the machine;

transmitting the digital representation to the user device over the network via the network connection prior to a disconnection of the user device from the machine, wherein the digital representation causes output of the data for the sale of the first item in the catalog when the user device lacks the network connection to the machine, and wherein the digital representation displays or hides the first price based on the price stability and the inventory level when the user device lacks the network connection;

in response to the user device reconnecting to the machine through the network, receiving a purchase request stored on the user device when the user device reconnects to the machine, wherein the purchase request was previously generated for the first item in the catalog of the application without the network connection of the user device and delayed from transmission until the user device reconnects to the machine;

determining a merchant from the plurality of merchants in closest proximity to a destination location of the user;

in response to receiving a second price for the first item from the merchant, transmitting, to the user device, an approval request of the purchase request of the first item for the second price, wherein the second price comprises a price change occurring during the disconnection of the user device from the machine; and     processing the purchase request for the first item with the merchant based on a response to the approval request from the user.

\* \* \* \* \*